Oct. 5, 1948.  J. R. LINDSAY  2,450,479
ELECTRICAL CONTROL CIRCUIT FOR INDICATING
MOVEMENTS OF POSITION INDICATORS
Filed Aug. 16, 1944

INVENTOR;
JAMES ROBERT LINDSAY,
BY
ATT'Y.

Patented Oct. 5, 1948

2,450,479

UNITED STATES PATENT OFFICE 2,450,479

ELECTRICAL CONTROL CIRCUIT FOR INDICATING MOVEMENTS OF POSITION INDICATORS

James Robert Lindsay, Bexley, Ohio, assignor to The Jeffrey Company, a corporation of Ohio Application August 16, 1944, Serial No. 549,739

3 Claims. (Cl. 250—27)

This invention relates to an electrical control circuit specifically designed to control the feed rate of a vibratory electro-magnetic motor, though other uses may be made of it.

An object of the invention is to provide an improved electrical system and circuit of the above-mentioned type which is operative in response to a scale or other condition indicator in which the apparatus does not react appreciably upon the scale.

Another object of the invention is to provide an electrical circuit and system of the above-mentioned type which may be variably controlled, depending upon whether certain associated apparatus is loaded or unloaded during the starting period.

A further object of the invention is generally to provide a more simple but highly sensitive control circuit for an electronic discharge tube so that the current output thereof is controlled by a scale or other controllable indicating device.

Still another object of the invention is to provide a control circuit for controlling an electron discharge tube by the phase shift control method which employs a condenser which may be charged in either of reverse directions and in variable amounts, which condenser and associated adjustable resistors are isolated electrically from the impedance of the grid or control circuit of the electron discharge tube.

Other objects of the invention will appear hereinafter, the novel features and combinations being set forth in the appended claims.

Figure 1:
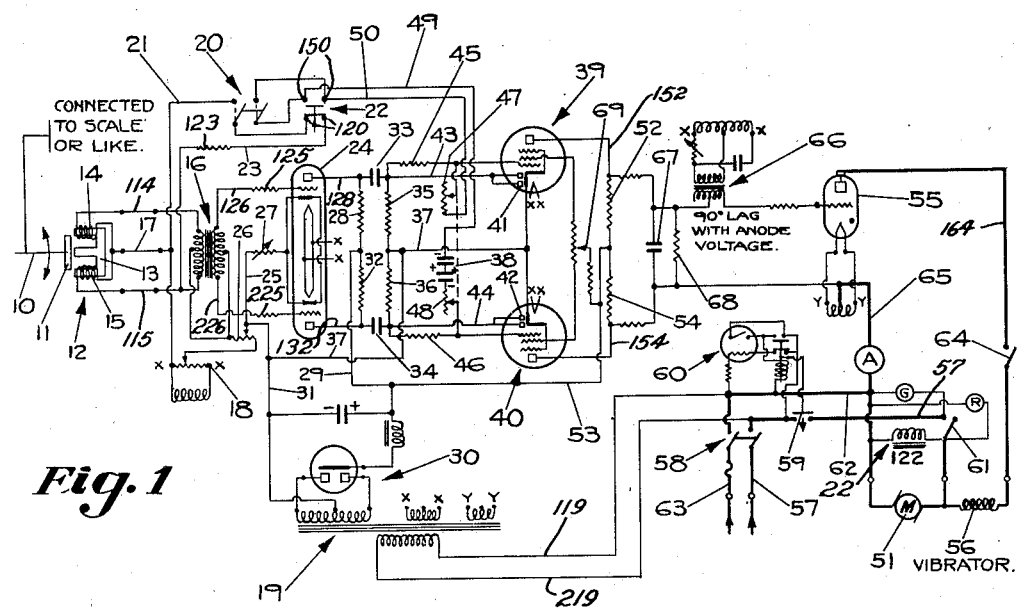
Figure 2:
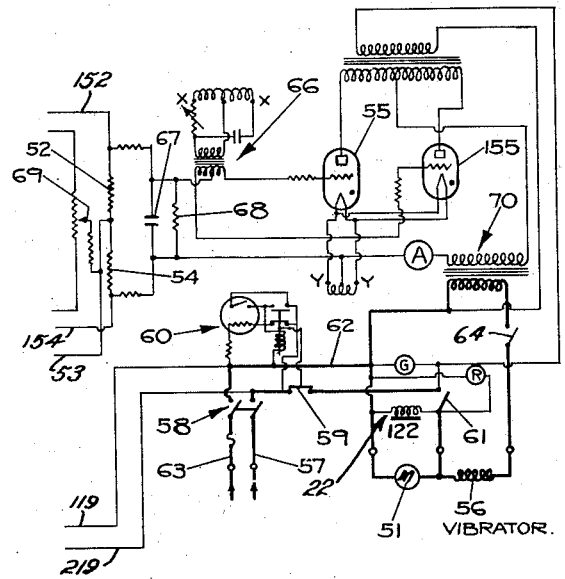

In the accompanying drawings,

Fig. 1 is a wiring diagram of an electrical circuit or system comprising my invention; and Fig. 2 shows in part a modification of the wiring diagram of Fig. 1.

It may be mentioned that the system or circuit which I have disclosed is designed as a substitute for that disclosed and claimed in the patent to Clyde W. Baird, No. 2,322,218, for a Control system, dated June 22, 1943. As a consequence, unless a contrary fact is indicated, disclosure of that patent is to be understood as incorporated herein by reference.

Referring particularly to Fig. 1 of the drawings, a scale 10, which may be controlled by a "Waytrol" device, for example, as disclosed in the patent to Earle V. Francis, No. 2,276,383, dated March 17, 1942, is provided with a magnetic armature 11. The position of the armature 11 and the scale 10 is an indication of a balanced, overbalanced or heavy, or an underbalanced or light condition, and obviously the degree of deflection of the scale 10 and armature 11 is indicative of the amount of overbalance or underbalance. As indicated in Fig. 1 of the drawings, the scale 10 and armature 11 are in a balanced position.

Armature 11 is the armature of a reactance type pickup device 12. It may be noted that this is a difference between the system herein disclosed and that of the Baird patent above mentioned, wherein the pickup is a transformer and is provided with both primary and secondary windings, both of which are energized from a transformer when the system is operating.

The pickup device 12 includes a core 13 with windings 14 and 15 connected on the outer legs thereof. Winding 14 is connected across the upper half of the primary winding of a transformer 16, and winding 15 is connected across the lower half of the primary winding thereof over conductors 114 and 115, respectively, and a common conductor 17 which has connected in series therewith a variable source of alternating current voltage provided by a rheostat 18 having a variable tap associated therewith; the rheostat 18 being energized by a secondary winding of a transformer 19 as indicated by the labels X—X.

The transformer 16 is a very high ratio step-up transformer which, for example, may be of the order of 25 to 1. If the armature 11 is in its neutral position, the voltage supplied to the common conductor 17 from the rheostat 18 will produce equal and opposite currents in the two halves of the primary winding of the transformer 16 and consequently zero voltage will be produced thereby between the upper and lower terminals or two halves of the secondary winding thereof. If the armature 11 is not in its neutral position, the reactance of coils 14 and 15 will be different and consequently there will be a differential current flow between the two halves of the primary winding of transformer 16 which will produce a corresponding differential voltage between the two halves of the secondary winding thereof, which voltage will vary in direction and amount as the position of the armature 11 varies in direction and amount.

In order to prevent a magnetic field in the reactance device 12 reflecting back into the armature 11, or in other words, in order that the position of the armature 11 may be practically independent of the influence of the magnetic field of the pickup device 12, said pickup device has a very small amount of energy or current flow.

Furthermore, since this is a reactor instead of a transformer (as is the pick-up device in the Baird Patent 2,322,218, above mentioned) which controls the current flow of a very high ratio step-up transformer, it is possible to keep down the amount of energy involved and still obtain adequate control voltage on the output of transformer 16 and thus maintain the independence of the armature 11 and of the scale beam 10.

In actual operation of a "Waytrol" there are two general conditions encountered. One is when the system is started with the conveyor belt unloaded. Under these conditions it is evident that since the belt is unloaded the scale beam will show a "light" or unloaded condition, and the tendency of the system is automatically to increase the feed rate of the vibratory feeder which feeds the "Waytrol" belt so that if this condition is allowed to persist during starting, the condenser 38 will build up after a short interval of time to produce a maximum feed and undesirably load the belt during starting. It is therefore desirable to place a restricting control on the system during starting of the "Waytrol" while unloaded. To this end I provide a control switch 20 which is closed when the system is started in operation and the "Waytrol" belt is unloaded. When switch 20 is closed, a circuit is provided over conductor 21, left-hand blade of switch 20, through the normally closed lower contacts 120 of a relay 22, the winding 122 of which is seen at the right-hand side of the drawings and also designated generally by the numeral 22, to conductor 23 having a resistor 123 in series therewith. This circuit provides a short-circuit for the winding 15 which is the "light" or unloaded winding of the pickup device 12. As a consequence the "light" winding is shunted out through a resistor during these starting conditions, with the "Waytrol" belt unloaded, and consequently the pickup device 12 will not call continuously for building up of the feed rate of the vibratory feeder until the belt starts as hereinafter described, when this short-circuit is removed.

The stepped-up voltage produced in the secondary of the winding 16 is split between the upper and lower halves thereof and delivered to independent input circuits of a double amplifier tube 24. The input circuits of the tube 24 include two control grids connected through protecting resistors 125 and 225 by conductors 126 and 226, respectively, connected to the top and bottom terminals, respectively, of the secondary of transformer 16 and have a common conductor 25 leading to their cathodes which has a source of A. C. voltage connected therewith provided by resistor 26. A variable resistor 27 is also connected in said common conductor 25. Resistor 27 provides a variable D. C. bias for the two halves of amplifier tube 24.

The voltages on the grids of the two separately operable portions of the vacuum tube 24 control the current flow in the plate, anode or output circuits thereof. The plate circuit for the upper half of tube 24 extends from the plate over a conductor 128 through a resistor 28 and common conductor 29 which leads to the positive terminal of the source of plate current which is illustrated as being a conventional full-wave rectifier 30 deriving energy from the transformer 19. The plate or output circuit is completed from the negative terminal of the rectifier 30 by way of conductor 31 which leads to the previously described common conductor 25 which is connected to both the filaments or cathodes of the tube 24. The output, anode or plate circuit of the lower half of tube 24 extends over conductor 132 from the plate thereof through resistor 32 and then to common conductor 29 which is connected to the positive terminal of rectifier 30. The balance of this circuit is the same as that for the upper half of tube 24 including conductors 31 and 25, etc.

As previously described, the transformer 16 is a high ratio step-up transformer and consequently a very low differential voltage appearing on its primary will be transformed to much higher voltages on the secondary. The current involved is exceedingly low and this is consistent with the action of the amplifier tube 24 since it is voltage and not current which is required to control the tube grid or input circuits thereof.

In addition to the differential voltage supplied by the secondary winding of transformer 16, which may be zero or it may reverse in direction and be variable in amount, both the grid circuits of said rectifier 24 have the voltage derived from resistor 26 superposed on the differential voltage.

The output current flowing from the two output circuits of the amplifier 24 through resistors 28 and 32, respectively, will have a value dependent upon the algebraic sum of the voltage derived from the resistor 26 and the differential voltage supplied by transformer 16.

The A. C. voltage which appears between the outer terminals of the resistors 28 and 32 is connected by coupling condensers 33 and 34 to the outer terminals of two resistors 35 and 36 whose inner terminals are connected together and connected to a common conductor 37 which in turn is connected to the negative terminal of the full-wave rectifier 30.

When a balanced condition exists on the pointer 10 and armature 11, the A. C. voltage appearing between the outer terminals of resistors 35 and 36 will be zero. This voltage will vary in direction and magnitude directly in accordance with the direction and magnitude of movement of the scale 10 and armature 11 from the neutral position.

It may be stated that the voltage which appears between the outer terminals of the resistors 35 and 36 is employed to control the charge on a condenser or condenser bank 38 which may be charged in reverse directions, and this charge is employed to control in turn the flow of current through a pair of combination amplifiers and rectifiers 39 and 40.

The circuits which provide this control will now be described. The tubes 39 and 40 have three grids. In addition to the usual cathode or filament and plate each has a pair of auxiliary plates designated 41 and 42, respectively, in the two tubes which are connected in parallel and which are connected respectively to the outer terminals of the resistors 35 and 36 by way of conductors 43 and 44, respectively. One of the grids of tube 39 is also connected to the outer terminal of resistor 35 through protecting resistor 45, and one of the grids of tube 40 is connected to the outer terminal of resistor 36 through protecting resistor 46.

The condenser 38 is connected directly across the above-mentioned grids of tubes 39 and 40 through correction increment control variable resistors 47 and 48, the variable contacts of which are mechanically connected so that they operate simultaneously. This circuit includes a pair of conductors 49 and 50 which lead to the upper contacts 150 of the relay 22 as well as the right-hand blade of the switch 20.

During the starting of the system, with the "Waytrol" belt unloaded and switch 20 closed as previously suggested, the right-hand blade thereof connects conductors 49 and 50 and thus connects the condenser 38 directly across the control grids of tubes 39 and 40 through the correction increment control resistors 47 and 48. On the other hand if the system is started with the belt of the "Waytrol" loaded, switch 20 is left open and the condenser 38 will be isolated and will hold whatever charge it had when the system was stopped, until the relay 22 is energized and lifts its contacts 120, under which conditions the previously described circuit over conductors 21, normally closed contacts 120 of relay 22, and conductor 23 which shunted out the "light" coil 15 of pickup device 12, will be open and the upper contacts 150 of relay 22 will close and connect conductors 49 and 50 thereby to connect condenser 38 in circuit as above described.

It may be stated that the operating coil 122 of relay 22 is connected in parallel with a synchronous electric motor 51 which is seen at the right-hand lower portion of Fig. 1 and which constitutes the driving motor for the belt or conveyor of the "Waytrol."

As is well known, the current flow in the plate circuits of the vacuum tube rectifiers 39 and 40 will be determined by the voltages on their grids and, as above mentioned, this is determined by the charge on the condenser 38 which, as above described, is in turn controlled by the position of the scale 10 and armature 11. In addition to the voltage on said grid circuits provided by the charge on the condenser 38, there is a negative voltage supplied to said grids by the voltage appearing between the outer terminals of resistors 35 and 36 and the consequent resultant grid voltage is determined by the sum of these applied negative voltages.

Before considering the network which provides these control grid voltages, it may be pointed out that the output, plate or anode circuit of the tube 39 extends from its plate over conductor 152 and resistor 52 to a common conductor 53 which is connected to the positive terminal of the full-wave rectifier 30. The plate of tube 40 is connected to said common conductor 53 through conductor 154 and resistor 54. The cathodes or filaments of tubes 39 and 40 are connected to common conductor 37 which is connected to the negative terminal of the source of direct current 30 as previously described. The value and direction of the direct current voltage which appears between the outer terminals of resistors 52 and 54 is employed to vary the phase relation between the grid or input and the plate or output voltages of a three electrode power tube 55, preferably of the gaseous type, the plate or output circuit of which is connected to energize the winding 56 of a vibratory feeder such as disclosed, for example, in the above-mentioned patent to Earle V. Francis. This feeder circuit may be traced as extending from an A. C. current power line conductor 57 through manual switch 58, the contact 59 of a thermal time delay relay 60 which only allows the application of power to the plate circuit of tube 55 after its filament has been heated for a predetermined time following the closing of switch 58 which also energizes the primary of transformer 19 over conductors 119 and 219.

From contact 59 the circuit extends over continuing conductor 57 to manual switch 61 which is connected to one terminal of the vibrator coil 56 as well as one terminal of the synchronous motor 51 and winding 122 of relay 22. With switch 61 closed, the motor 51 will start since its other terminal is connected to conductor 62 which leads through switch 58 to the other power line conductor 63.

From the one terminal of the coil of vibrator 56 the circuit therefore extends through said coil to the plate of gaseous power tube 55 over conductor 164 which includes a control switch 64. The filament of the tube 55 leads to an energizing secondary of transformer 19, the center of which is connected by conductor 65 through an ammeter to conductor 62. Signal lamps designated G and R are connected to show that contacts 59 are closed and that switch 61 is closed, respectively.

As is well understood in this art and as pointed out in the Baird patent above identified, the current flow to the winding 56 or, in other words, the output current of tube 55 is controlled by the phase shift method which is effected by varying the value of D. C. voltage superposed on a 90 degree lagging A. C. voltage connected to the grid or input circuit of the tube 55. This 90 degree lagging A. C. voltage is supplied by transformer 66 which is connected by a phase shift network with one of the secondary windings of transformer 19.

I also preferably provide a filter condenser 67 and filter resistor 68 across the outside terminals of resistors 52 and 54. The common terminals of resistors 52 and 54 are connected by a variable tap 69 which constitutes a pickup balance control, which tap 69 is associated with a resistor, the outer terminals of which lead to second grids of the two tubes 39 and 40. The third or stabilizing grids of these tubes are connected to their indirectly heated cathodes.

Attention is now directed to the operation of the system by which the voltages of the control grids of tubes 39 and 40 associated with resistors 45 and 46, are controlled. Assuming that a voltage appears between the outer terminals of the resistors 35 and 36 and that at the instant the outer terminal of resistor 35 is positive, during this positive half cycle the resistor 35 will be effectively short-circuited because of the fact that the plates 41 and the cathode of tube 39 are connected directly across the terminals of resistor 35, and through the positive half of this wave current can flow between said cathode and plates 41.

During this half cycle the outer terminal of resistor 36 will, of course, be negative and since plates 42 and associated cathode of tube 39 would present an open circuit to a negative terminal on said plates 42, resistor 36 would not be effectively short-circuited, and the voltage appearing across it would be delivered to said control grid of tube 40 since the input or grid circuit of tube 40 is connected directly across resistor 36 by way of resistor 46.

During the next half cycle the conditions will reverse and the resistor 36 will be short-circuited, while resistor 35 will not, and consequently its voltage will be applied as a negative bias to the grid of tube 39.

In addition to this recurrent negative grid bias on the tubes 39 and 40 which appears whenever there is a voltage on resistors 35 and 36, there is a voltage applied to the grids of both said tubes 39 and 40 as determined by the charge on condenser 38, and this charge on condenser 38, as well as the biasing grid voltage above mentioned, will be determined by the position of armature 11 and the consequent voltage appearing on the outer terminals of resistors 35 and 36.

It is, of course, obvious that a number of conditions may exist in connection with the ultimate grid voltages on tubes 39 and 40. For example, the charge on the condenser will necessarily oppose the component of grid voltage on tube 39 while it aids that on tube 40 and vice versa. The amount of the ultimate grid bias on tubes 39 and 40 will depend both on the value of the charge on condenser 38, its direction and the value of the instantaneous voltage appearing on the terminals of resistors 35 and 36. The net result will be, however, that the direct current voltage on the terminals of resistors 52 and 54 will vary in amount as determined by the position of the pointer 10 and armature 11.

The circuit which provides for charging of the condenser 38 in either of the two reverse directions, will be obvious, considering one typical situation. Assuming that an unbalanced condition has produced a voltage on the outer terminals of resistors 35 and 36 as above suggested, with the terminal of resistor 35 positive, current will flow from said terminal through resistor 45 and correction increment control resistor 47 through connected conductors 50 and 49 to the condenser 38. The other terminal of the condenser 38 extends through resistor 48 and resistor 46 to the free terminal of resistor 36. However, under the conditions assumed, as previously mentioned, resistor 35 is effectively short-circuited by plates 41 and the associated cathode of tube 39. Therefore, only the voltage appearing on resistor 36 will charge the condenser 38 during this half cycle. During the succeeding half cycle the condenser 38 will be charged in a reverse direction. The final result will be that the charge on the condenser 38 is determined by the difference between the two succeeding half cycles of current delivered thereto, and this difference, of course, is determined by the difference between the negative half cycles of the A. C. voltage appearing between the outer terminals of resistors 35 and 36 and the common conductor 27.

This difference in half cycles in turn is controlled by the position of armature 11 since the voltage superposed on the bias and voltage produced by resistor 36, as determined by the position of armature 11, will aid half of the cycle and oppose the other half of the cycle. For example, if armature 11 is in its neutral position the two half cycles will be equal. As a consequence, no voltage will appear on the outer terminals of resistors 35 and 36. If armature 11 is unbalanced in one direction one half cycle of the voltage appearing on resistors 35 and 36 will be greater than the other half cycle and in an amount determined by the variation of armature 11 from its normal position. On the other hand, if armature 11 varies in the opposite direction from its normal or neutral position, the voltage superposed on that provided by resistor 36 will be in the opposite direction and in an amount determined by the variation of said armature 11 from its neutral position, which will produce an opposite condition of differential voltage between the positive and negative half cycles as they appear on the outer terminals of resistors 35 and 36.

It is thus evident that this differential of half cycles of A. C. produced between the terminals of resistors 35 and 36 and the common conductor 27 determines the charge on condenser 38 and this charge may be zero or may be negative on either of its terminals and in an amount which may be varied. This voltage on the condenser 38 is then superposed on the voltage delivered directly to the grids of the tubes 39 and 40 by any voltage between the terminals of resistors 35 and 36 and conductor 27, and obviously the voltage on the condenser 38 will make the grid of one of the tubes 39, 40 more negative by adding to it in a negative sense and will make the grid of the other tube 39, 40 less negative by subtracting from it in a negative sense. That is, the grids of tubes 39 and 40 are always negative when there is a voltage on the terminals of resistors 35, 36, and this negative bias is either enhanced or decreased by the charge on condenser 38.

It is also evident that when conductors 49 and 50 are connected together, as they are when the system is operating, there will be a high resistance shunt circuit for the condenser 38, tending always to discharge it. This high resistance shunt circuit includes resistors 48, 46, 36, 35, 45 and 47 and the conductors which connect them across the terminals of said condenser 38.

When the system is shut down and relay 22 deenergized and switch 20 open, condenser 38 floats and retains its charge. The closing of switch 20 or the operation of relay 22 closes the high resistance shunt circuit for condenser 38. Obviously the charging of the condenser 38 as above described is always working against the shunt discharging thereof, as above mentioned.

In Fig. 2 of the drawings I have illustrated a modification which relates almost exclusively to the circuit for the vibrator 56. In this arrangement I employ two gaseous discharge power tubes 55 and 155 which are connected as full wave rectifiers. The grid circuits of these tubes are both controlled from the transformer 66 so that they operate on alternate half cycles. Their common plate circuits extend to a reactor transformer 70, the primary winding of which carries the D. C. output current from the two power tubes 55 and 155, and the reactance of the reactor transformer 70 is directly proportional to this current. The secondary of the saturation reactance transformer 70 is connected in series with the winding 56 across the conductors 57 and 63. As is well known by varying the reactance of said saturation reactor 70 by controlling the current flow through its terminal, the current flow through the vibrator 56 may be controlled and thus its feed rate may be controlled.

The arrangement of Fig. 2 is particularly desirable where a large vibratory feeder 56 is employed, both because it employs two power tubes 55 and 155 and further because of the fact that the current output of tubes 55 and 155 is not delivered directly to the vibrator 56 but merely controls the reactance of its circuit which requires less current than may be required by the feeder itself.

To reiterate briefly the operation of the system of either figure, the switch 58 is first closed which energizes the transformer 19. Substantially simultaneously therewith switches 61 and 64 are closed. If the belt of the "Waytrol" is loaded, switch 20 is left open; otherwise it is closed. After a predetermined heating interval determined by relay 60, contacts 59 will close which will start the motor 51 and the vibrator 56 and energize relay 22.

The feed rate of the vibratory feeder 56 will be controlled in direct response to the position of the scale 10 and armature 11. Furthermore, the average or normal feed rate of the vibratory feeder 56 will be automatically determined by the system because if the scale is consistently "light," it will build up a charge on the condenser 38 which will continue until the "light" condition is rectified; in other words, until the feeder 56 is feeding at a rate to prevent a "light" condition. In other words, condenser 38 builds up its own normal charge which determines the normal feed rate of the feeder 56. Simultaneously condenser 38 tends always to discharge in the absence of a charging voltage being supplied to it. This tends to move the feeder 56 slightly towards a "light" condition which in turn is reflected in the pointer 10 and armature 11 which immediately produces an additional charge on condenser 38 to increase the feed rate of vibratory feeder 56. Instantaneous variations which cause unbalance of the scale 10 and armature 11 are automatically immediately reflected by a different charge on the condenser 38 and a different grid bias on the tubes 39 and 40 which produce immediate response in the vibratory feeder 56.

All control of the feed rate of vibratory feeder 56 is by controlling the current flow in the plate or output circuit of power tube 55 by the phase shift method which, as above described, is effected by varying the direct current voltage across the outer terminals of resistors 52 and 54 in direct response to the operation of the scale 10 and armature 11.

In the modification of Fig. 2 the current of the tubes 55 and 155 does not flow directly into the windings of the vibratory feeder 56 but through the primary winding of saturation reactor 70 which in turn controls the current flow through the vibrator 56 and thus its amplitude of vibration.

The extent to which the predetermined movement of the armature is reflected in a correction increment of increased or decreased vibration of vibrator 56, may be adjusted by adjusting the mechanically connected resistors 47 and 48. This increment may be made very small or relatively large, as desired.

The gain of the tube 24 may be adjusted by adjusting the variable resistor 27. The balance of the pickup may be adjusted by adjusting the tap 69. This is the electrical equivalent of adjusting the balancing weight on the beam 10. For example, the beam 10 could actually be unbalanced a predetermined amount and still indicate a balanced condition by adjusting the tap 69.

A number of important features are evident in connection with my system. First of all, the switch 20 and relay 22 provide for effective isolation of the condenser 38 as well as effective disconnection of the "light" coil 15 of pickup device 12.

The introduction of in-phase biasing voltage for the amplifier system is made in the grid circuit of the first amplifier tube 24, being provided by resistor 26. Of considerable importance also is the fact that the condenser 38 is electrically entirely isolated with respect to impedance of the grid circuit of the power tube 55. This is particularly important because adjustments of the increment resistors 47 and 48 do not have any influence on the grid circuit of the power tube 55. In other words, the only variable in connection with the input circuit of power tube 55 is the variable D. C. voltage applied across the terminals of condenser 67 and resistor 68, and physical adjustments of resistors 47 and 48 associated with condenser 38 do not require any adjustment in the source of 90 degrees lagging voltage including transformer 66 applied to the grid of tube 55.

Furthermore, the use of the combination rectifier and amplifier tubes 39 and 40 as well as the double amplifier tubes 24 makes for a minimum number of electronic tubes.

Still further, the system is one which requires a minimum of power in the pickup device 12 which leaves the scale 10 and armature 11 substantially without reaction from the pickup device, thus maintaining their action substantially entirely independently thereof and with a minimum of disrupting influence.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A control system for an electronic tube including a magnetic pick-up device operable in response to heavy and light conditions of an indicator, and switch means for temporarily disabling the light side of said pick-up.

2. A control circuit including a condition indicator adapted to indicate a normal condition and opposite abnormal conditions such as heavy and light, an electrical pick-up device of the reactance type operative variably as determined by said condition indicator, amplifier means connected to and controlled by said pick-up device and providing an output alternating current voltage varying in amount and direction as said indicator moves to opposite sides of its normal position, a condenser connected to said amplifier to receive a charge in either of reverse directions as determined by the condition indicator, a pair of resistors connected in series across said condenser, combination rectifier amplifiers connected to the output of said amplifier and energized by said output voltage and including means effective to control the charge on said condenser and to produce a direct current voltage in the output circuits of said rectifier amplifiers under the control of said condenser and also including means to short circuit said resistors successively in response to the alternating current voltage across them, an electronic tube, and means responsive to said produced direct current voltage for controlling the current output of said electronic tube.

3. A control circuit including a condition indicator adapted to indicate a normal condition and opposite abnormal conditions such as heavy and light, an electrical pick-up device operative variably as determined by said condition indicator, amplifier means connected to and controlled by said pick-up device and providing an output alternating current voltage varying in amount and direction as said indicator moves to opposite sides of its normal position, a condenser connected to said amplifier to receive a charge in either of reverse directions as determined by the condition indicator, a pair of resistors connected in series across said condenser, combination rectifier amplifiers connected to the output of said amplifier and energized by said output voltage and including means effective to control the charge on said condenser and to produce a direct current voltage in the output circuits of said rectifier amplifiers under the control of said condenser and also including means to short circuit said resistors successively in response to the alternating current voltage across them, an electronic tube, and means responsive to said produced direct current voltage for controlling the current output of said electronic tube.

JAMES ROBERT LINDSAY.

REFERENCES CITED

The following references are of record in the file of this patent:

UNITED STATES PATENTS

| Number | Name | Date |
|---|---|---|
| 2,039,666 | Schade | May 5, 1936 |
| 2,048,758 | Starrett | July 28, 1936 |
| 2,176,742 | La Pierre | Oct. 17, 1939 |
| 2,183,412 | Sledd | Dec. 12, 1939 |
| 2,242,053 | Watson | Aug. 12, 1941 |
| 2,287,876 | Haight | June 30, 1942 |
| 2,322,217 | Baird | June 22, 1943 |
| 2,366,415 | Lindsay | Jan. 2, 1945 |
| 2,382,993 | Haskins | Aug. 21, 1945 |
| 2,391,532 | Wilmotte | Dec. 25, 1945 |
| 2,399,695 | Satterlee | May 7, 1946 |
| 2,417,868 | Glass | Mar. 25, 1947 |